United States Patent
Wee et al.

(10) Patent No.: US 8,255,581 B2
(45) Date of Patent: Aug. 28, 2012

(54) ELECTRONIC DEVICE HAVING PHYSICAL SWITCH TO SELECT FUNCTIONALITY EXPOSED TO HOST COMPUTING DEVICE

(75) Inventors: Liang Z. Wee, Techview (SG); Jessica M. J. Tan, Techview (SG); Hoon W. Soon, Techview (SG)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 12/763,051

(22) Filed: Apr. 19, 2010

(65) Prior Publication Data

US 2011/0258348 A1    Oct. 20, 2011

(51) Int. Cl.
*G06Q 20/00* (2012.01)
*G06F 3/00* (2006.01)

(52) U.S. Cl. ................. 710/14; 705/16; 710/8

(58) Field of Classification Search .......... 235/1 A–495; 705/1.1, 16, 17, 21; 710/1, 8, 13, 14; 719/321, 719/327

See application file for complete search history.

(56) References Cited

U.S. PATENT DOCUMENTS

| | | |
|---|---|---|
| 6,754,811 B1 | 6/2004 | Cat et al. |
| 7,203,728 B2 | 4/2007 | Lum |
| 2006/0160569 A1 * | 7/2006 | Chen et al. ............ 455/557 |

OTHER PUBLICATIONS

Touch Pro2 User Manual; 2009; HTC; pp. 1-264.*

* cited by examiner

*Primary Examiner* — Richard B Franklin
(74) *Attorney, Agent, or Firm* — Steve Bennett (57) ABSTRACT

An electronic device has primary and secondary functionalities. The electronic device includes a physical switch to switch between a first mode and a second mode. The electronic device includes logic to, when the electronic device is connected to a host computing device, expose the primary functionality to the host computing device when in the first mode, and expose the secondary functionality to the host computing device when in the second mode. The host computing device typically requires a driver particular to the electronic device when the primary functionality is exposed, and does not typically require a driver particular to the electronic device when the secondary functionality is exposed. The secondary functionality may include acting as a removable storage device storing a text file. The text file may contain information regarding the electronic device, and a user may modify the text file to cause a corresponding action to be performed.

13 Claims, 4 Drawing Sheets

```
DIAGNOSTIC INFORMATION:                              ~200

FIRMWARE VERSON: 1.0B
NUMBER OF BAR CODES SCANNED: 45012
UNSUCESSFUL SCAN ATTEMPTS: 19
DATE LAST CALIBRATED: NOVEMBER 22, 2009
DATE LAST USED: FEBRUARY 15, 2010
TOTAL TIME ON: 2,300 HOURS
```

FIG 3A

```
CONFIGURATION INFORMATION:                           ~300

BAR CODE SCANNING MODE: [1D] 2D
INTENSITY OF OPTICAL BEAM: HIGH [MEDIUM] LOW
NUMBER OF SCAN ATTEMPTS: 1 [3] 5
OUTPUT MODE: 7-BIT ASCII [8-BIT UNICODE]
SOUND WHEN BAR CODE SCANNED: [ON] OFF
AUTOMATIC BACKLIGHT CONTROL: ON [OFF]

INSTRUCTIONS: TO CHANGE ANY PARAMETER, PLACE
BRACKETS AROUND DESIRED OPTION AND SAVE FILE
```

FIG 3B

```
CONFIGURATION INFORMATION:                           ~300'

BAR CODE SCANNING MODE: [1D] 2D
INTENSITY OF OPTICAL BEAM: [HIGH] MEDIUM LOW
NUMBER OF SCAN ATTEMPTS: 1 [3] 5
OUTPUT MODE: 7-BIT ASCII [8-BIT UNICODE]
SOUND WHEN BAR CODE SCANNED: ON [OFF]
AUTOMATIC BACKLIGHT CONTROL: ON [OFF]

INSTRUCTIONS: TO CHANGE ANY PARAMETER, PLACE
BRACKETS AROUND DESIRED OPTION AND SAVE FILE
```

FIG 4A

```
MENU OPTIONS

1  VIEW DIAGNOSTIC INFORMATION
2  VIEW AND MODIFY CONFIGURATION INFORMATION
3  PERFORM CALIBRATION

OPTION SELECTED: [3]

INSTRUCTIONS: TO SELECT AN OPTION, ENTER OPTION
NUMBER BETWEEN BRACKETS AND SAVE FILE
```

FIG 4B

```
THIS TEXT FILE WILL AUTOMATICALLY BE APPENDED WITH
THE RESULTS OF THE CALIBRATION WHEN IT IS FINISHED

2010-FEB-19 08:05 AM  CALIBRATION STARTED
```

FIG 4C

```
THIS TEXT FILE WILL AUTOMATICALLY BE APPENDED WITH
THE RESULTS OF THE CALIBRATION WHEN IT IS FINISHED

2010-FEB-19 08:05 AM  CALIBRATION STARTED
2010-FEB-19 08:17 AM  CALIBRATION FINISHED
2010-FEB-19 08:17 AM  RESULTS: OK, NO ERRORS
```

ELECTRONIC DEVICE HAVING PHYSICAL SWITCH TO SELECT FUNCTIONALITY EXPOSED TO HOST COMPUTING DEVICE

FIELD OF THE INVENTION

The present invention relates generally to electronic devices, such as point-of-sale (POS) devices, and more particularly to such an electronic device that has a physical switch to select whether a primary functionality or a secondary functionality of the host computing device is exposed to a host computing device to which the electronic device is connected. The secondary functionality may be the electronic device acting as a removable storage device storing a text file by which the electronic device passes information to a user of the host computing device, and which can be modified by the user to effect a corresponding change to the electronic device.

BACKGROUND OF THE INVENTION

Electronic devices that can be connected to a host computing device include point-of-sale (POS) devices, such as cash registers, handheld bar code scanners, and other types of POS devices. Such a specialized electronic device typically requires that the host computing device include a driver particular to the electronic device for the host computing device to communicate with the electronic device when connected. Electronic devices that can be connected to a host computing device also include removable storage devices, such as universal serial bus (USB) flash drives, USB portable disk drives, and other types of removable mass storage devices. Such a removable storage device typically does not require that the host computing device include a driver particular to the electronic device for the host computing device to communicate with the electronic device. This is because the vast majority of modern operating systems include built-in generic drivers for such removable storage devices.

SUMMARY OF THE INVENTION

An electronic device of an embodiment of the invention includes a component to provide a primary functionality and a secondary functionality. The electronic device includes a physical switch for a user to switch the electronic device between a first mode and a second mode. The electronic device includes logic to expose the primary functionality to the host computing device when the electronic device is in the first mode, via the physical switch, and is connected to a host computing device. The logic is further to expose the secondary functionality to the host computing device when the electronic device is in the second mode, via the physical switch, and is connected to the host computing device. In one embodiment, the secondary functionality may be the electronic device acting as a removable storage device storing a text file by which information is passed to the host computing device, and which can be modified by a user to effect a change to the electronic device.

A method of an embodiment of the invention includes detecting, by the electronic device, whether manipulation of a physical switch of the electronic device has resulted in selection of a first mode or a second mode, in response to the electronic device being connected to a host computing device. In response to detecting that the physical switch has resulted in selection of the first mode, the method includes exposing, by the electronic device, a primary functionality to the host computing device, in the first mode. In response to detecting that the physical switch has resulted in selection of the second mode, the method includes exposing, by the electronic device, a secondary functionality to the host computing device, in the second mode. In one embodiment, the secondary functionality may be the electronic device acting as a removable storage device storing a text file by which information is passed to the host computing device, and which can be modified by a user to effect a change to the electronic device.

A computer program product of an embodiment of the invention includes a computer-readable storage medium having computer-readable code embodied therein. The computer-readable code is executable by an electronic device having a physical switch to switch the electronic device between a first mode and a second mode. The computer-readable code includes first computer-readable code to expose a primary functionality to a host computing device when the electronic device has been connected thereto and is in the first mode. The computer-readable code includes second computer-readable code to expose a secondary functionality to the host computing device when the electronic device is connected thereto and is in the second mode. In one embodiment, the secondary functionality may be the electronic device acting as a removable storage device storing a text file by which information is passed to the host computing device, and which can be modified by a user to effect a change to the electronic device.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, specialized electronic devices include point-of-sale (POS) devices like cash registers and handheld bar code scanners. A user may wish to view diagnostic information or configuration information of such an electronic device, or change the configuration information of the electronic device. The user may thus connect the electronic device to a host computing device like a laptop or desktop computer.

However, in most cases, for the host computing device to properly communicate with the electronic device, a driver particular to the electronic device has to be installed within the operating system of the host computing device. For example, electronic devices that connect to host computing devices via the universal serial bus (USB) interface typically require that the host computing devices have drivers particular to the electronic devices. A user that does not have the appropriate driver, then, is unable to view diagnostic information or configuration information of an electronic device, or change the configuration information of the electronic device.

Nearly all modern operating systems, though, typically include built-in generic drivers for removable storage devices. Examples of removable storage devices include USB flash drives, USB portable disk drives, and other types of removable mass storage devices. That is, regardless of the type or brand of a particular removable storage device, a user can connect the device to a host computing device and begin using the device without having to provide the operating system of the host computing device with a driver particular to the specific type or brand of the removable storage device.

In an embodiment of the invention, then, this feature of modern operating systems is leveraged. In particular, an electronic device, such as a POS device, includes a physical switch for a user to switch the electronic device between a first mode corresponding to a primary functionality of the electronic device and a second mode corresponding to a secondary functionality of the electronic device. When the electronic device is connected to a host computing device, the functionality exposed by the electronic device to the host computing device is controlled by which mode the user has selected via the physical switch.

For example, the primary functionality of the electronic device may include the electronic device actually being a POS device. As such, when the electronic device is in the first mode and connected to a host computing device, a user can interact with the electronic device through the host computing device to use the POS functionality of the electronic device. However, as noted above, a driver particular to the electronic device has to be available for the operating system of the host computing device to initially recognize and make the electronic device available at the host computing device.

If this driver is unavailable, or the user just wishes to view or modify diagnostic, configuration, or other information regarding the electronic device, the user may switch the electronic device to the second mode. The secondary functionality of the electronic device exposed to the host computing device may be the electronic device acting as a simple removable storage device storing a text file. The user can access the text file at the host computing device, because the electronic device is acting as a removable storage device and not as a specialized electronic device like a POS device, even though the electronic device may indeed be a specialized electronic device.

In this way, the user is able to view diagnostic, configuration, and other information regarding the primary functionality of the electronic device, even though the host computing device sees the electronic device as a generic removable storage device and may be unaware that the electronic device is actually a specialized electronic device like a POS device. As updated information becomes available, the electronic device may append this updated information to the text file for viewing by the user at the host computing device. Furthermore, the user may change the information contained in the text file, which when detected by the electronic device, causes the electronic device to perform a corresponding action.

For example, the text file may contain configuration information of the electronic device. The user may modify the configuration information at the host computing device, and save the changed text file as stored at the electronic device. Upon detecting that the configuration information has been changed, the electronic device may modify the configuration of its primary functionality in accordance with the change that the user has made. In this way, the user can receive information from the electronic device at the host computing device, even though a driver particular to the electronic device is not installed within the operating system of the host computing device.

As another example, the text file may contain a menu of options that are available to the user. The user may enter into the text file a letter or number corresponding to a desired option to select the option, and save the changed text file. Upon detecting that the user has entered the letter or number, the electronic device may perform an action corresponding to the selected option. In this way, the user can interact with the electronic device at the host computing device, even though a driver particular to the electronic device is not installed within the operating system of the host computing device.

Figure 1:
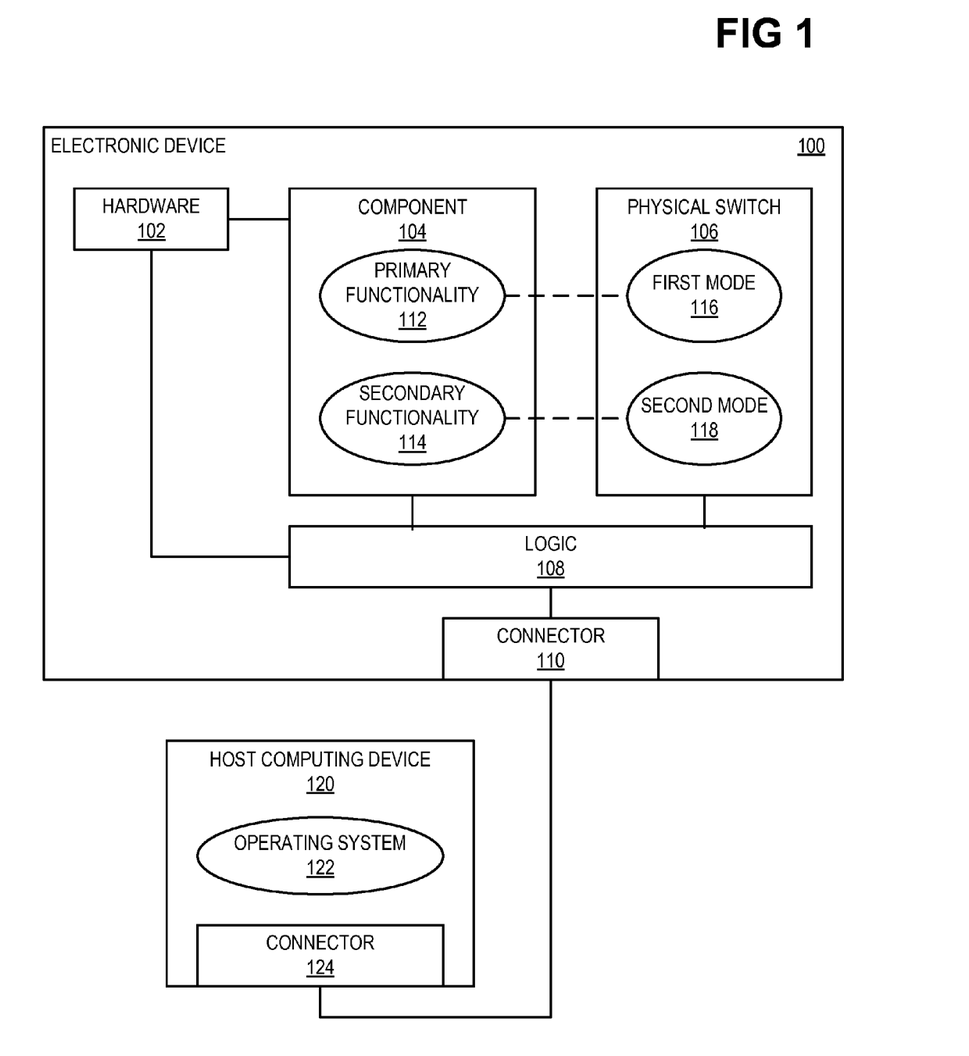
FIG. 1 is a diagram of an electronic device, according to an embodiment of the present invention.

FIG. 1 shows an electronic device 100, according to an embodiment of the invention. The electronic device 100 includes hardware 102, a component 104, a physical switch 106, logic 108, and a connector 110. The electronic device 100 is in a wired or a wireless manner connected to a host computing device 120, such as a desktop or a laptop computer, that includes an operating system 122 and a connector 124. For example, the connector 110 of the electronic device 100 may be physically connected to the connector 124 of the host computing device 120. The connectors 110 and 124 may be USB connectors in one embodiment of the invention.

The hardware 102 may include a processor, memory, volatile and non-volatile storage devices, and/or other types of hardware, including application-specific integrated circuits (ASICs) and the like. The hardware 102 is said to implement the component 104 and the logic 108. For instance, the component 104 and the logic 108 may include computer programs that are stored on and executed by the hardware 102, in one embodiment of the invention.

The component 104 provides a primary functionality 112 and a secondary functionality 114 of the electronic device 100. The primary functionality 112 is functionality to achieve the intended purpose for which the electronic device 100 is used. For example, the primary functionality 112 may include the electronic device 100 being a POS device, such as a cash register, a bar code scanner, or another type of POS device.

By comparison, the secondary functionality 114 is not functionality to achieve the intended purpose for which the electronic device 100 is used, but rather is functionality that is subsidiary to the primary functionality 112, and may assist the primary functionality 112 to achieve the intended purpose. For example, the secondary functionality 114 may include the electronic device 100 acting as a removable storage device that has a text file stored thereon. In this respect, the primary functionality 112 of the electronic device 100 is not to act as a removable storage device, such that the electronic device 100 is not just a removable storage device per se. Rather, such secondary functionality 114 can assist the primary functionality 112 achieving the intended purpose of the electronic device 100, as is described in more detail later in the detailed description.

As a more concrete example, consider the case where the electronic device 100 is a POS device, specifically a bar code scanner. The primary functionality 112 of the electronic device 100 is thus being a bar code scanner. The intended purpose of the electronic device 100 in this respect may be to optically scan bar codes, and provide the information contained within the bar codes to the host computing device 120. By comparison, the secondary functionality 114 of the electronic device 100 in this example is acting as a removable storage device storing a text file. The text file may contain information regarding the primary functionality 112, such as diagnostic information, as well as configuration information that can be modified by a user.

In this respect, the secondary functionality 114 assists the primary functionality 112 to achieve the intended purpose of the electronic device 100, in that the diagnostic information can be used to determine whether the bar code scanner is properly functioning, and in that the configuration information can be used to configure the bar code scanner. However, the secondary functionality 114 does not actually achieve the intended purpose of the electronic device 100. That is, the secondary functionality 114 does not relate to the actual providing of the information contained within the bar codes to the host computing device 120 as scanned by the bar code scanner.

The physical switch 106 is physical in that a user can manipulate the switch 106, such as by using his or her fingers, for instance. The physical switch 106 is desirably located on the outside of the electronic device 100, so that the switch 106 can be manipulated without having to open the case of the device 100. The physical switch 106 permits a user to switch the electronic device 100 between a first mode 116 and a second mode 118. The first mode 116 corresponds to the primary functionality 112 of the electronic device 100, and the second mode 118 corresponds to the secondary functionality 114 of the device 100.

When the electronic device 100 is connected to the host computing device 120, the logic 108 exposes the primary functionality 112 of the electronic device 100 to the host computing device 120 when the electronic device 100 is in the first mode 116 as selected via the physical switch 106. Also when the electronic device 100 is connected to the host, the logic 108 exposes the secondary functionality 114 of the electronic device 100 to the host computing device 120 when the electronic device 100 is in the second mode 118 as selected via the physical switch 106. It is in this respect that the first mode 116 corresponds to the primary functionality 112, and that the second mode 118 corresponds to the secondary functionality 114.

In one embodiment, the operating system 122 of the host computing device 120 requires a driver particular to the electronic device 100 when the electronic device 100 is connected to the host computing device 120 and the primary functionality 112 has been exposed to the host computing device 120. By comparison, in this embodiment, the operating system 122 does not require a driver particular to the electronic device 100 when the electronic device 100 is connected to the host computing device 120 and the secondary functionality 114 has instead been exposed to the host computing device 120. As such, if a user of the host computing device 120 does not have the driver particular to the electronic device 100 available, he or she can still access the electronic device 100 at the host computing device 120 by switching the physical switch 106 to the second mode 118.

For example, where the secondary functionality 114 is the electronic device 100 acting as a removable storage device storing a text file, the electronic device 100 may thus be emulating a removable storage device like a USB flash drive or a USB hard disk drive. The operating system 122 of the host computing device 120 typically has preinstalled generic drivers for such removable storage devices. In this way, when the physical switch 106 has resulted in selection of the second mode 118 such that the secondary functionality 114 is exposed, the operating system 122 can recognize the electronic device 100 and permit the user access to the electronic device 100 at the host computing device 120.

By comparison, in this example, the operating system 122 of the host computing device 120 may not have installed drivers for the electronic device 100 per se—that is, when the primary functionality 112 is exposed to the host computing device 120. If the user does not have these drivers available, the electronic device 100 is unusable and generally inaccessible at the host computing device 120. For instance, the operating system 122 may report that the connected electronic device 100 is unknown, and is not working properly, because a driver for the electronic device 100 is not installed. This example thus shows how a user can still access the electronic device 100, via the secondary functionality 114, even when the driver for the electronic device 100 per se is not installed and unavailable as to the primary functionality 112.

Examples of the types of information that can be included and modified within the text file in the case where the secondary functionality 114 is exposed to the host computing device 120 are now described. In these examples, the electronic device 100 is a POS device, where the primary functionality 112 of the device 100 is to be a bar code scanner. In these examples, it is presumed that the electronic device 100 is operating in the second mode 118 corresponding to the secondary functionality 114.

Figure 2:
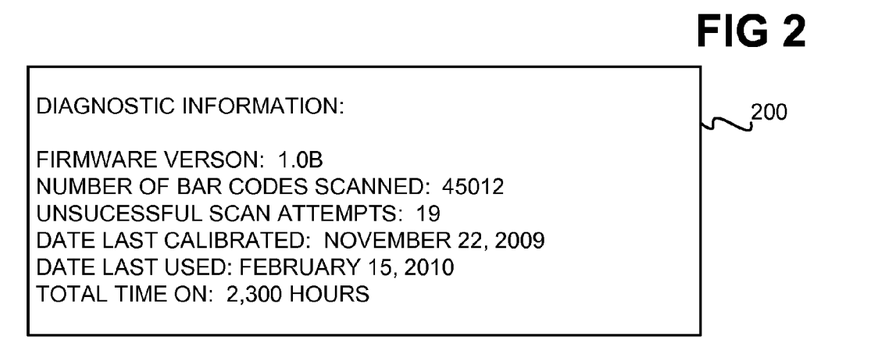
FIG. 2 is a diagram of a text file depicting representative diagnostic information of an electronic device, according to an embodiment of the present invention.

FIG. 2 shows an example text file 200 containing diagnostic information pertaining to the primary functionality 112 of the electronic device 100, according to an embodiment of the invention. The user accesses the text file 200 stored on the electronic device 100 at the host computing device 120, such as by using a text file editor or reader running on the operating system 122. The diagnostic information includes specific information concerning the electronic device 100, such as its firmware version, the number of bar codes that have been scanned, and the number of unsuccessful scan attempts. Other specific diagnostic information includes the date when the electronic device 100 was last calibrated, the date when the device 100 was last used, and the total number of hours that the electronic device 100 has been on.

Figure 3A:
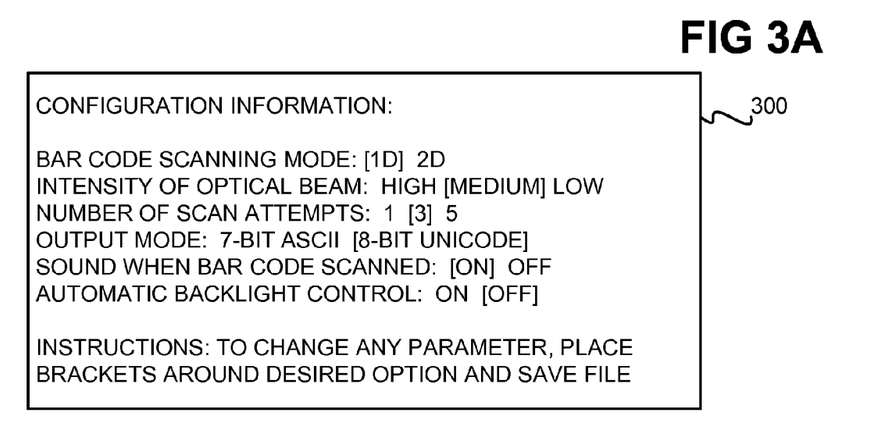
FIGS. 3A and 3B are diagrams of a text file depicting representative configuration information of an electronic device, where a user can change the configuration information within the text file to effect a corresponding change in the configuration of the electronic device, according to an embodiment of the invention.
Figure 3B:
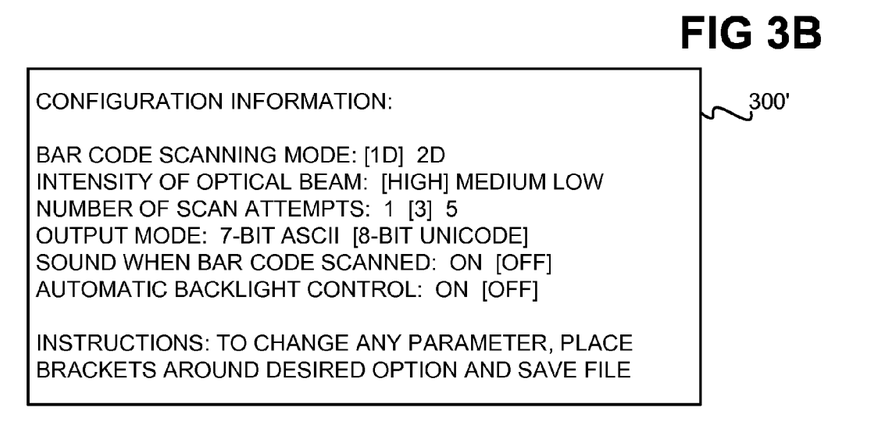

FIGS. 3A and 3B show an example text file 300 containing configuration information pertaining to the primary functionality 112 of the electronic device 100 and that can be modified by a user, according to an embodiment of the invention. The user accesses the text file 300 of FIG. 3A stored on the electronic device 100 at the host computing device 120, such as by using a text file editor running on the operating system 122. The configuration information includes various parameters of the electronic device 100 that a user can modify, such as the bar code scanning mode, the optical beam intensity, the number of scan attempts to be made for a given bar code, and the output mode of the bar code scanner. Other configuration information includes whether a sound is made when a bar code has been scanned, and whether automatic backlight control is turned on or off.

The text file 300 of FIG. 3A instructs the user that he or she can change a parameter by placing brackets around the desired option and saving the file. For example, in FIG. 3A, the selected optical beam intensity is medium, and a sound being made when a bar code has been scanned is selected. In FIG. 3B, the user has modified the text file 300, where the text file 300' is the modified version of the text file 300, so that the optical beam intensity is now high, and so that a sound is no longer made when a bar code has been scanned. When the user saves the text file 300' as stored on the electronic device 100, the component 104 of the electronic device 100 detects these two changes that have been made. In response, the component 104 modifies the configuration of the electronic device 100 in accordance with these changes.

Figure 4A:
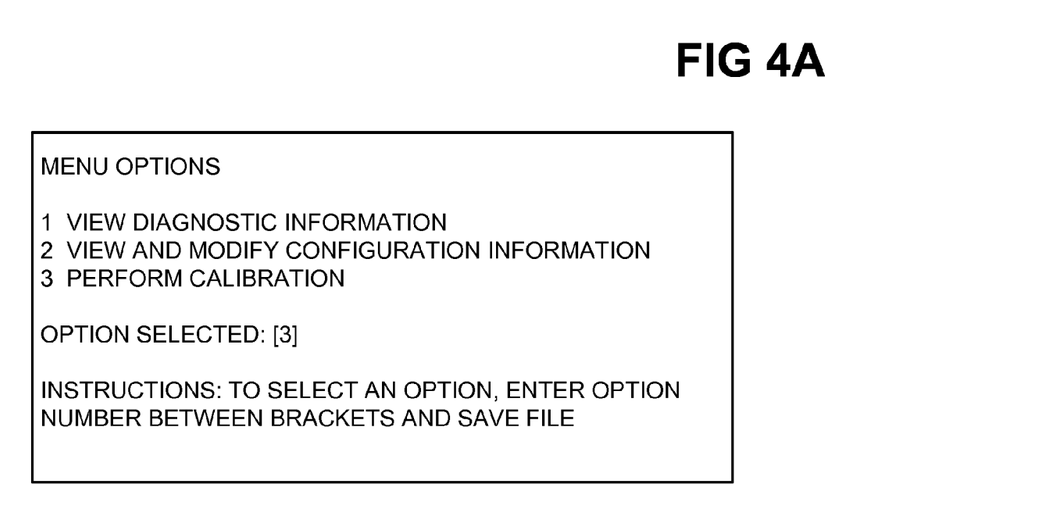
FIG. 4A is a diagram of a text file depicting a representative menu of options that a user can selected by entering corresponding numbers or letters within the text file to interact with the electronic device, according to an embodiment of the present invention.

FIG. 4A shows an example text file 400 containing a menu of options pertaining to the primary functionality 112 of the electronic device 100 and from which a desired option can be selected by a user, according to an embodiment of the invention. The user accesses the text file 400 of FIG. 4A stored on the electronic device 100 at the host computing device 100, such as by using a text file editor running on the operating system 122. The menu of options includes three options: view diagnostic information; view and modify configuration information; and, perform calibration.

The user is instructed in the text file 400 to select an option by placing its corresponding number within the brackets and saving the file. Alternatively, letters or other text characters can be used. In the example of FIG. 4A, the user has selected the third option by modifying the text file 400. When the user saves the text file 400 as stored on the electronic device 100, the component 104 of the electronic device 100 detects this change that has been made. In response, the component 104 performs an action in accordance with the given option selected by the user. In the particular example in question, the electronic device 100 is calibrated.

Figure 4B:
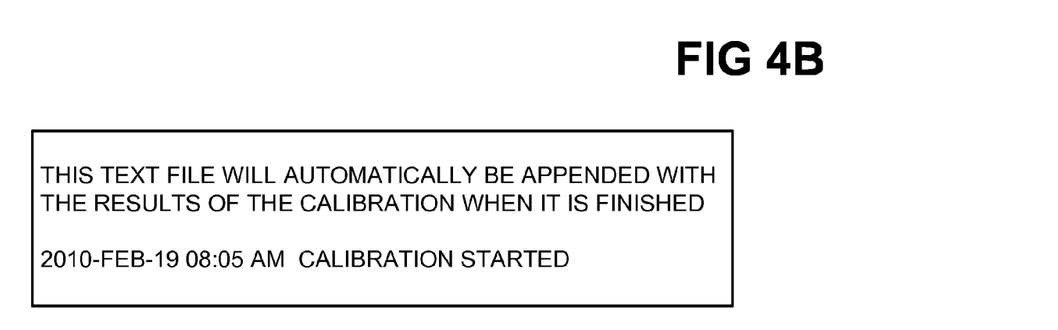
FIGS. 4B and 4C are diagrams of text files depicting performance of an action responsive to a user selecting an option in the menu of FIG. 4A, and depicting appending updated information regarding the performance of the action, respectively, according to an embodiment of the present invention.
Figure 4C:
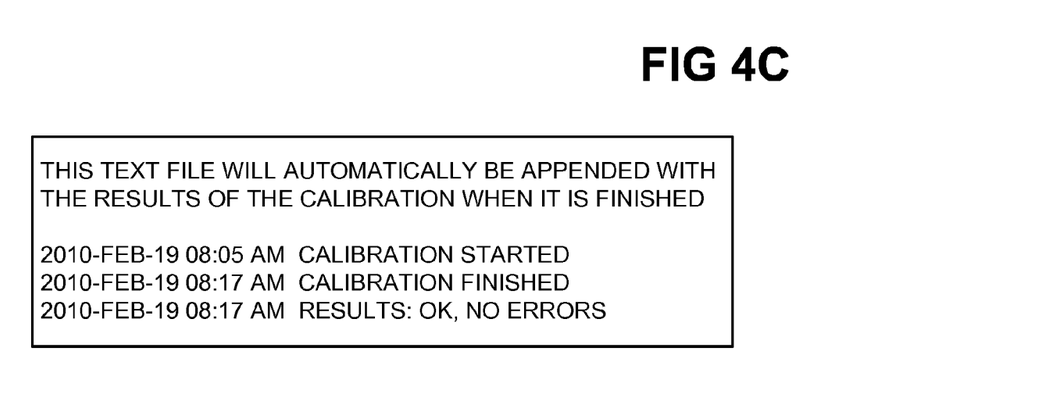

FIGS. 4B and 4C show an example text file 402 containing output information regarding the electronic device 100 for viewing by a user, according to an embodiment of the invention. This output information particularly pertains to the calibration of the electronic device 100, as previously selected by the user in FIG. 4A. The user accesses the text file 402 of FIG. 4A stored on the electronic device 100 at the host computing device 120, such as by using a text file editor or reader running on the operating system 122.

In FIG. 4A, the text file 402 indicates that at a certain time, calibration of the electronic device 100 has been started. In FIG. 4B, when the calibration is finished, the component 104 of the electronic device 100 automatically appends updated output information regarding the electronic device 100 to the text file 402. The text file 402' is thus the updated version of the text file 402. The text file 402' indicates that calibration finished at a certain time, and that the results of the calibration are that no errors occurred. The original information contained in the text file 402 in FIG. 4A is still present in the updated text file 402' in FIG. 4B.

In one embodiment, the user may be viewing the text file 402 using a type of text editor or reader running on the operating system 122 of the host computing device 120 that automatically detects when the text file 402 has been updated as the text file 402'. For example, the text editor or reader may detect that the last modified date and time of the text file 402 has changed. In this embodiment, the text file or reader may automatically display the updated text file 402' for viewing by the user. Therefore, the user is able to view the text file 402' as soon as the component 104 has appended the updated output information to the previous version of the text file 402' (i.e., the text file 402). In another embodiment, the user may manually have to reload the text file 402 into a text editor or reader to discern whether additional output information has been appended, or may manually inspect the last modified date and time periodically to determine whether the text file 402 has been updated as the text file 402'.

In general, the specific embodiments of FIGS. 3A and 3B and of FIG. 4A depict how a text file stored on the electronic device 100 can be modified by a user at the host computing device 120 to interact with the electronic device 100. The component 104 detects that a change has been made to the text file. In response, the component 104 performs an action in accordance with this change. In the example of FIGS. 3A and 3B, the component 104 configures the electronic device 100 in accordance with the changes made by the user to the text file 300. In the example of FIG. 4A, the component 104 causes the electronic device 100 to be calibrated, in accordance with the calibration option being selected via the change made by the user to the text file 400.

The embodiments of FIG. 2, FIGS. 3A and 3B, and FIGS. 4A, 4B, and 4C thus show a user can access and interact with the electronic device 100, even though the operating system 122 of the host computing device 120 may not have a driver particular to the electronic device 100 as to the primary functionality 112 of the device 100. Specifically, the fact that the operating system 122 has a generic driver for removable storage devices is leveraged, by exposing the electronic device 100 as a removable storage device to the host computing device 120, via the secondary functionality 114. The electronic device 100 uses a text file in the second mode 118 corresponding to the secondary functionality 114 to convey information to the user, and to receive input from the user.

From the perspective of the host computing device 120, the text file is simply being displayed to the user, and changes made by the user to the text file simply saved to the electronic device 100. The host computing device 120 is unaware that the text file contains information regarding the primary functionality 112 of the electronic device 100, since indeed the host computing device 120 may be unaware that the electronic device 100 even has functionality other than acting as or being a removable storage device. Furthermore, the host computing device 120 is unaware that the electronic device 100 is using changes made by the user to the text file as input in response to which the device 100 then performs actions.

Figure 5:
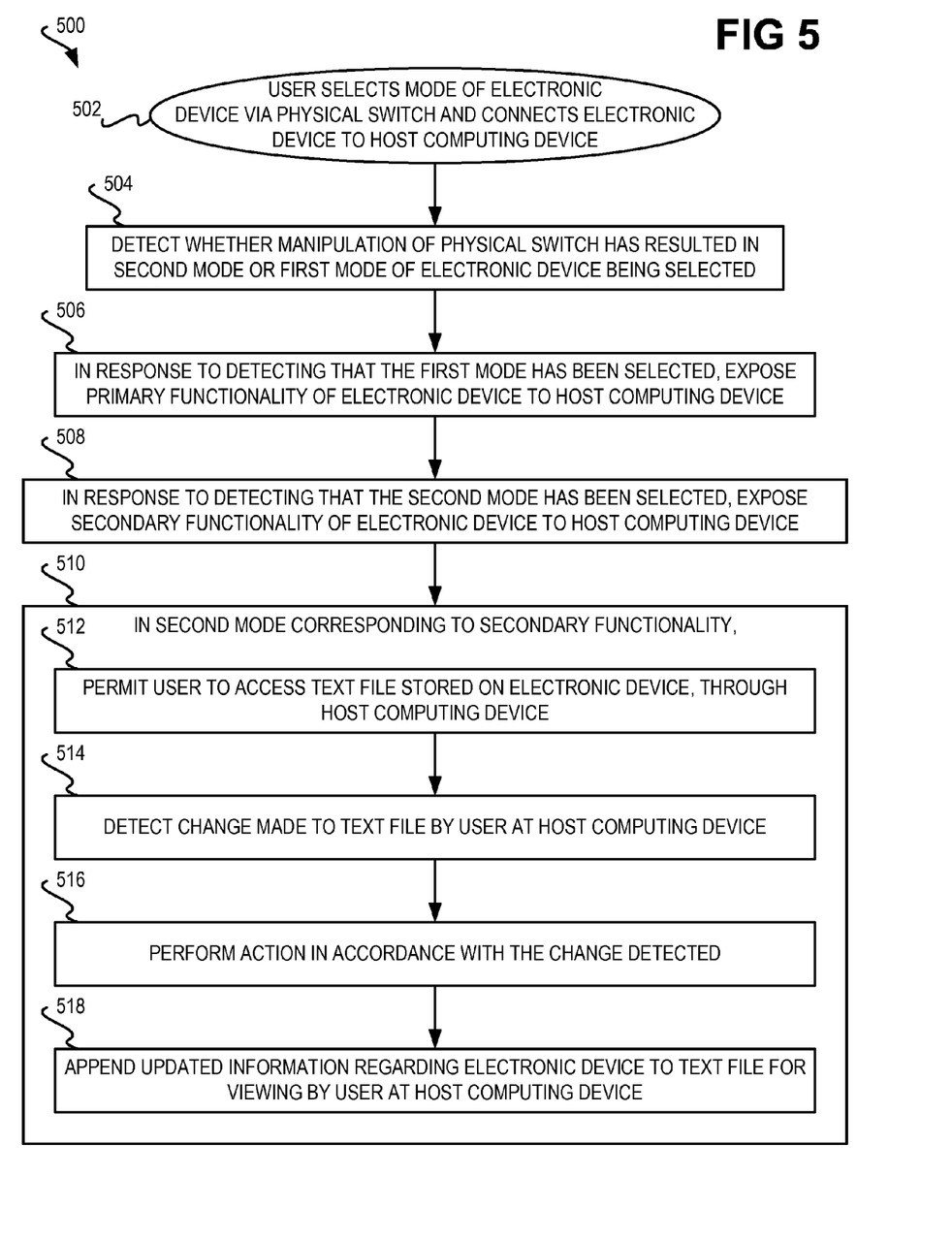
FIG. 5 is a flowchart of a method, according to an embodiment of the present invention.

FIG. 5 shows a method 500 that can be performed by the electronic device 100, according to an embodiment of the invention. The method 500 can be implemented as computer-readable code stored on a computer-readable data storage medium of a computer program product. A user selects the mode of the electronic device 100 via the physical switch 106, and connects the electronic device 100 to the host computing device 120.

In response, the logic 108 of the electronic device 100 detects whether manipulation of the physical switch 106 by the user has resulted in the first mode 116 or the second mode 118 of the device 100 having been selected (504). If the electronic device 100 detects that the first mode 116 has been selected, then the component 104 of the device 100 exposes the primary functionality 112 of the electronic device 100 to the host computing device 120 (506). By comparison, if the electronic device 100 detects that the second mode 118 has been selected, then the component 104 exposes the secondary functionality 114 of the device 100 to the host computing device 120 (508).

In one embodiment, the electronic device 100 performs the following in the second mode 118 corresponding to the secondary functionality 114 (510), where the secondary functionality 114 is the device 100 acting as a removable storage device storing a text file. The component 104 permits the user to access the text file stored on the electronic device 100, through the host computing device 120, for viewing (512), as has been described in relation to FIGS. 2, 3A, 3B, 4A, 4B, and 4C. The component 104 further can detect a change made to the text file by the user at the host computing device 120 (514), as has been described in relation to FIGS. 3A, 3B, and 4A. In response, the component performs an action in accordance with the detected change (516), as has been described in relation to FIGS. 3B, 4A, and 4B. The component 104 may also append updated information regarding the electronic device 100 to the text file for viewing by the user at the host computing device 120 (518), as has been described in relation to FIG. 4B.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. An electronic device comprising:
   a component to provide a primary functionality of the electronic device and a secondary functionality of the electronic device;
   a physical switch for a user to switch the electronic device between a first mode and a second mode; and,
   logic to, when the electronic device is connected to a host computing device, expose the primary functionality of the electronic device to the host computing device when the electronic device is in the first mode via the physical switch, and expose the secondary functionality of the electronic device to the host computing device when the electronic device is in the second mode via the physical switch,
   wherein in the second mode, the secondary functionality of the electronic device comprises the electronic device acting as a removable storage device having a file stored thereon,
   and wherein the file contains one or more of: diagnostic information regarding the electronic device; configuration information regarding the primary functionality of the electronic device; a menu of options for selection by a user at the host computing device; and, output information regarding the electronic device for viewing by the user.

2. The electronic device of claim 1, wherein in the first mode, the primary functionality of the electronic device comprises the electronic device being a point-of-sale (POS) device.

3. The electronic device of claim 1, wherein the logic is to detect a change made to the file by a user at the host computing device,
   and wherein the component is, in response to detecting the change made to the file, to modify configuration of the electronic device in accordance with the change.

4. The electronic device of claim 1,
   wherein the component is to detect a change made to the file by a user at the host computing device information regarding, the change corresponding to selection by the user of a given option of the menu of options,
   and wherein the component is, in response to detecting the change made to the file, to perform an action in accordance with the given option selected by the user.

5. The electronic device of claim 1, wherein the logic is to detect a change made to the file by a user at the host computing device,
   and wherein the component is, is in response to detecting the change made to the file, to perform an action in accordance with the change.

6. The electronic device of claim 1, wherein the component is to append updated output information regarding the electronic device to the file for viewing by the user.

7. The electronic device of claim 1, wherein an operating system of the host computing device requires a driver particular to the electronic device when the electronic device is connected to the host computing device and when the primary functionality of the electronic device is exposed to the host computing device,
   and wherein the operating system does not require the driver particular to the electronic device when the electronic device is connected to the host computing device and when the secondary functionality of the electronic device is exposed to the host computing device.

8. A method comprising:
   in response to an electronic device being connected to a host computing device,
   detecting, by the electronic device, whether manipulation of a physical switch of the electronic device has resulted in selection of a first mode of the electronic device or a second mode of the electronic device;
   in response to detecting that the physical switch has resulted in selection of the first mode of the electronic device,
     exposing, by the electronic device, a primary functionality of the electronic device to the host computing device, in the first mode; and,
   in response to detecting that the physical switch has resulted in selection of the second mode of the electronic device,
     exposing, by the electronic device, a secondary functionality of the electronic device to the host computing device, in the second mode,
   wherein in the second mode, the secondary functionality of the electronic device comprises the electronic device acting as a removable storage device having a file stored thereon, an operating system of the host computing device not requiring a driver particular to the electronic device when the secondary functionality is exposed to the host computing device
   and wherein the file contains one or more of: diagnostic information regarding the electronic device; configuration information regarding the primary functionality of the electronic device; and, a menu of options for selection by a user at the host computing device.

9. The method of claim 8, wherein in the first mode, the primary functionality of the electronic device comprises the electronic device being a point-of-sale (POS) device, an operating system of the host computing device requiring a driver particular to the electronic device when the primary functionality is exposed to the host computing device.

10. The method of claim 8, further comprising, in the second mode:
    detecting, by the electronic device, a change made to the file by a user at the host computing device; and,
    in response to detecting the change made to the file, performing, by the electronic device, an action in accordance with the change.

11. The method of claim 8, further comprising, in the second mode:

appending updated information regarding the electronic device to the file for viewing by a user at the host computing device.

12. A computer program product comprising:
a computer-readable storage medium having computer-readable code embodied therein, the computer-readable code executable by an electronic device having a physical switch for a user to switch the electronic device between a first mode and a second mode, the computer-readable code comprising:
first computer-readable code to expose a primary functionality of the electronic device to a host computing device, when the electronic device has been connected to the host computing device and when the electronic device is in the first mode;
second computer-readable code to expose a secondary functionality of the electronic device to the host computing device, when the electronic device is connected to the host computing device and when the electronic device is in the second mode, where in the second mode, the secondary functionality of the electronic device comprises the electronic device acting as a removable storage device having a file stored thereon; and,
third computer-readable code to:
detect a change made to the file by a user at the host computing device;
in response to detecting the change made to the file, perform an action in accordance with the change; and,
append updated information regarding the electronic device to the file for viewing by a user at the host computing device.

13. The computer program product of claim 12, wherein the host computing device requires a driver particular to the electronic device when the primary functionality is exposed to the host computing device,
and wherein the host computing device does not require the driver particular to the electronic device when the secondary functionality is exposed to the host computing device.

* * * * *